United States Patent [19]

Sindelar et al.

[11] 4,241,628
[45] Dec. 30, 1980

[54] WIRE STRIPPING MACHINE AND METHOD THEREFOR

[75] Inventors: William F. Sindelar, Towson; James R. Hetmanski, Perry Hall, both of Md.

[73] Assignee: Black & Decker Inc., Newark, Del.

[21] Appl. No.: 51,644

[22] Filed: Jun. 25, 1979

[51] Int. Cl.³ .............................................. H02G 1/12
[52] U.S. Cl. ......................................... 81/9.51; 140/1
[58] Field of Search ...................... 81/9.51; 140/1, 149

[56] References Cited

U.S. PATENT DOCUMENTS

| | | | |
|---|---|---|---|
| 2,783,525 | 3/1957 | Scharf | 81/9.51 X |
| 3,003,375 | 10/1961 | Hopkins | 81/9.51 |
| 3,795,159 | 3/1974 | Steiner et al. | 81/9.51 |
| 3,881,374 | 5/1975 | Gudmestad | 81/9.51 |
| 3,916,733 | 11/1975 | Meadows | 81/9.51 |
| 3,922,934 | 12/1975 | Hiatt | 81/9.51 |
| 3,994,188 | 11/1976 | Baba et al. | 81/9.51 |
| 4,009,738 | 3/1977 | Baba et al. | 140/149 |
| 4,043,362 | 8/1977 | Senior et al. | 140/1 |
| 4,109,553 | 8/1978 | Drinkard, Jr. et al. | 81/9.51 |

*Primary Examiner*—James G. Smith
*Attorney, Agent, or Firm*—Leonard Bloom; Edward D. Murphy; Harold Weinstein

[57] ABSTRACT

A wire stripping machine for stripping the insulation from the ends of a plurality of stranded-core insulated wires and twisting the exposed conductor strands includes upper and lower stripping heads mounted on a support for movement between an open position and a closed, operative position. Each stripping head includes wire separating discs that separate the wires to-be-stripped so that they lie laterally adjacent one another and a stripping element that simultaneously strips the insulation from the ends of the wires and twists the conductor strands. Each stripping element includes an elongated stripping bar having a serrated wire contacting surface and an insulation cutting knife that extends along the length of the stripping bar and presents a cutting edge positioned above the wire contacting surface. In operation, the entire machine is advanced from an initial position over the end of the insulated wires and the upper and lower stripping heads are moved from their open position toward their operative position. The separating discs separate the wires so that they lie laterally adjacent one another while the ends of the wires are restrained between the wire contacting surfaces and the cutting edges penetrate the insulation on the upper and lower sides of the wires. The stripping elements are then moved laterally of the wires in opposite directions to rotate the ends of the wires and cause the cutting edges to peripherally cut the insulation at the end of each wire. The machine is then retracted while the stripping elements continue to move in opposite lateral directions to separate and pull the cut insulation from the end of each wire and simultaneously twist the exposed conductor strands.

35 Claims, 16 Drawing Figures

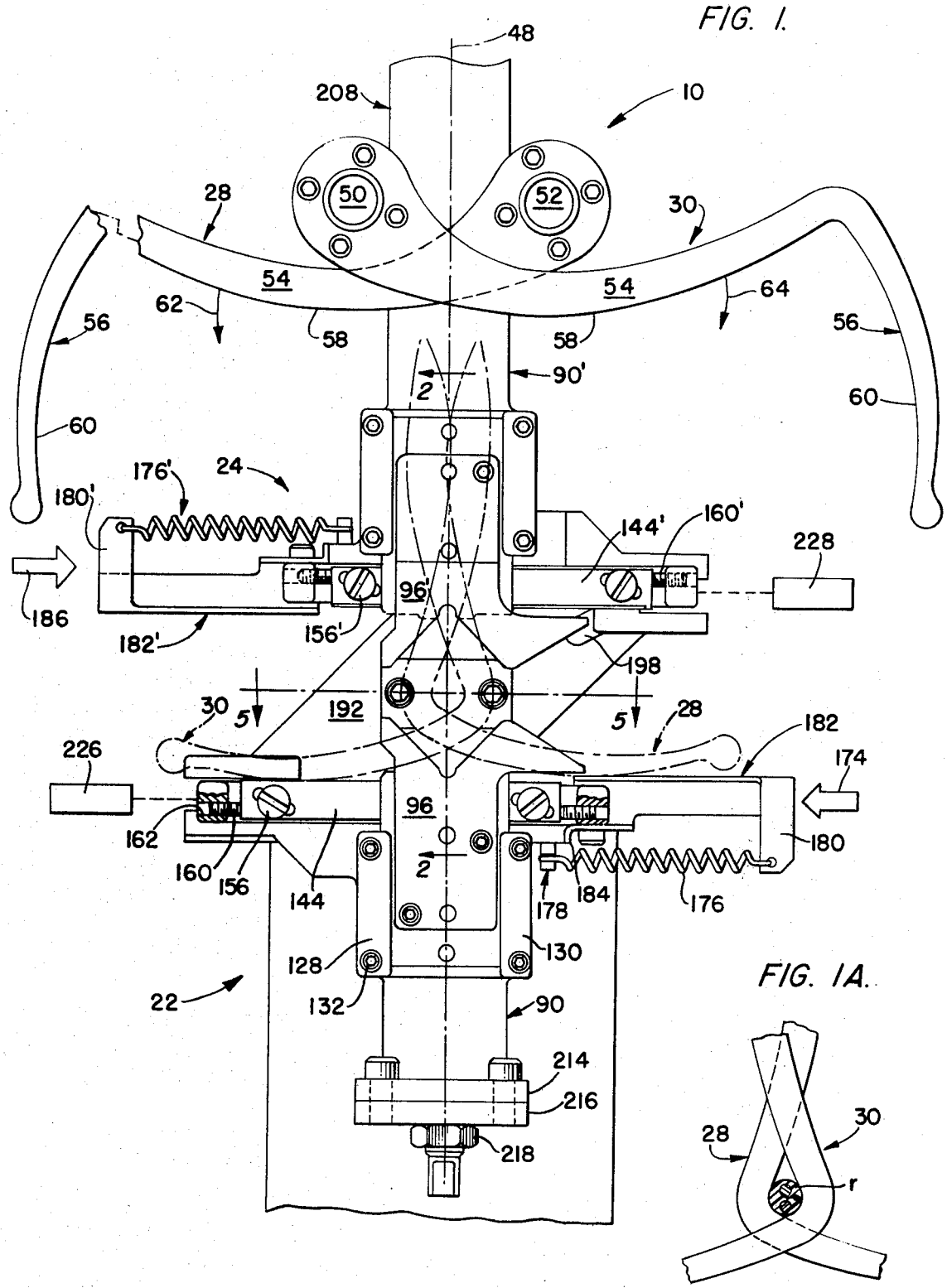

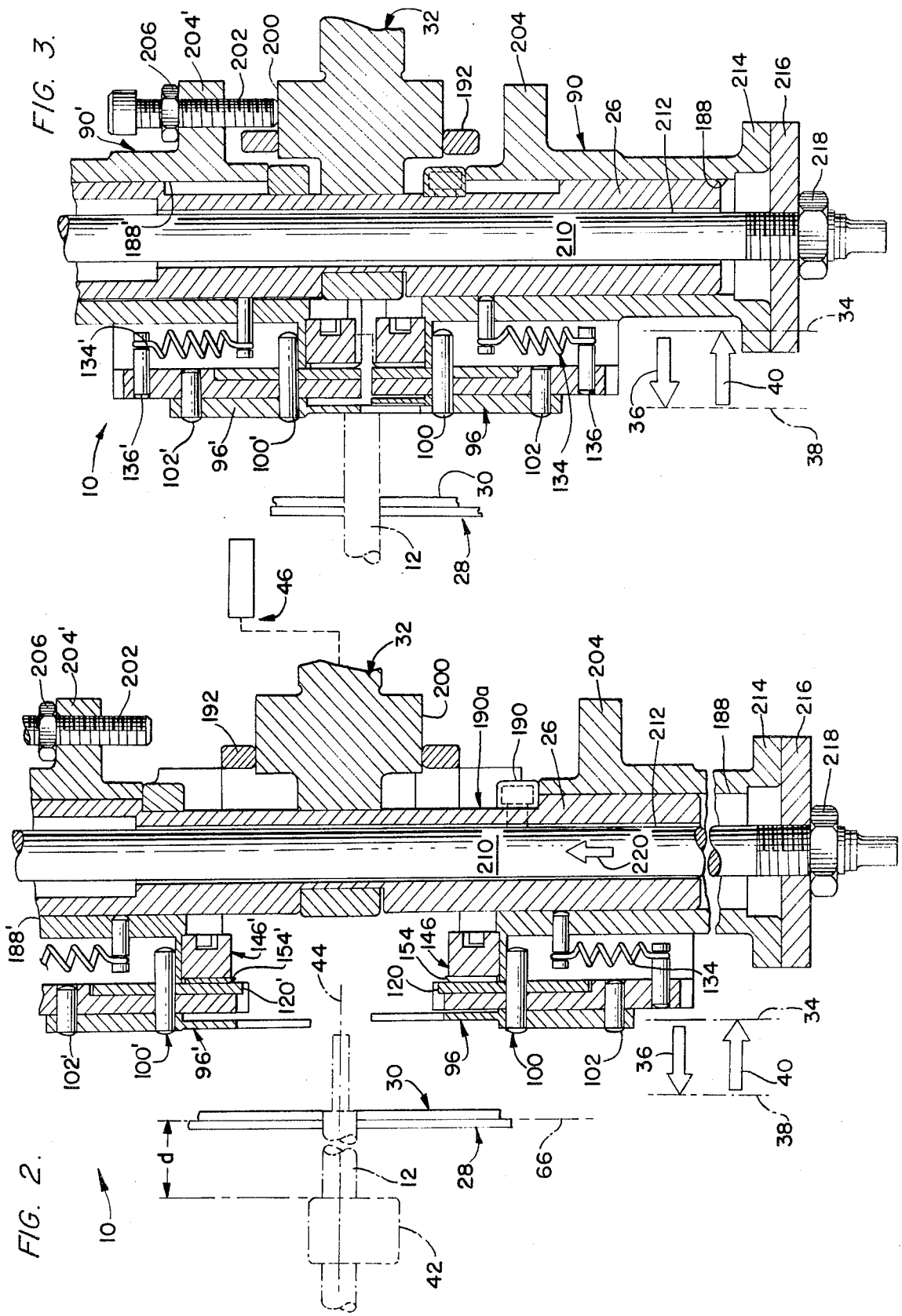

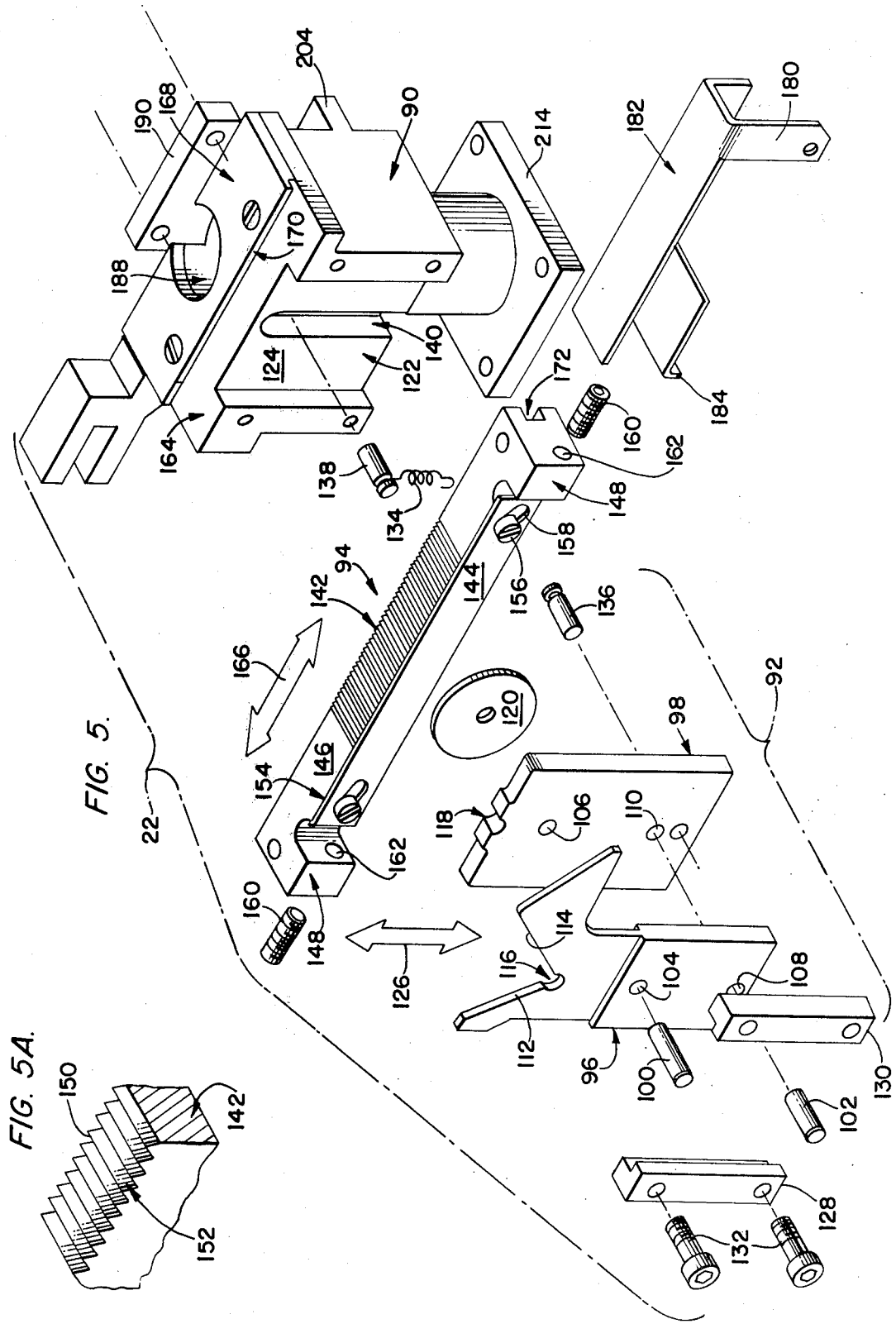

WIRE STRIPPING MACHINE AND METHOD THEREFOR

CROSS REFERENCE TO RELATED APPLICATIONS

The subject matter of this patent application is related to that disclosed in U.S. patent application Ser. No. 052,045, filed on even date herewith by W. Sindelar for a Wire Stripping Machine and Stripping Element Therefor, and U.S. patent application Ser. No. 051,643, filed on even date herewith by J. Hetmanski, for a Wire Locating Device for a Wire-Working Station.

BACKGROUND OF THE INVENTION

1. Field of the Invention

This invention relates to a wire stripping machine for stripping the insulation from the ends of a plurality of insulated wires and, more particularly, to a wire stripping machine for separating a plurality of insulated, stranded-core wires so that they lie laterally adjacent one another and for simultaneously stripping the insulation from the end of each wire and twisting the conductor strands.

2. Prior Art

In the manufacture of stranded-core electrical power cords, for example, two-wire power cords for use with electrically operated devices including power tools and appliances, the power cord is typically manufactured by removing a predetermined length of cord from a supply reel and preparing one or both ends of the cord by removing a portion of the outer insulating jacket, removing the jute filler-strings, unwrapping the helically wrapped wires, removing the insulation from the wires that extend from the outer jacket, and then twisting the exposed conductor strands. The so-prepared wire ends may then be crimp-fitted to an electrical terminal or tinned with solder in preparation for a subsequent soldering operation, for example.

Two general types of stripping machines, the rotating head type and the reciprocating bar type, are known in the prior art for removing insulation from the end of a stranded-core insulated wire and twisting the exposed conductor strands.

The rotating head machine, as disclosed in U.S. Pat. No. 2,783,525 to Scharf and U.S. Pat. No. 3,881,374 to Gudmestead, for example, includes a rotatable head which accepts the end of an insulated wire aligned along a wire stripping axis. The head carries a blade or blades which penetrate the insulation near the end of the wire to a depth less than the insulation wall thickness to prevent nicking or damage to the wire core. The head is then rotated about the wire stripping axis causing the cutting edge or edges to effect a peripheral cut so that the end of the wire has a continuous, encircling cut that extends partially through the insulated wire leaving only a small annular ring of uncut insulation adjacent the wire core. The so-cut wire and the stripping head are then separated from one another, either by pulling the wire from the head or by pulling the head from the wire, causing the insulation to separate at its cut-plane. The stripping head continues to rotate as the insulation is separated to cause the so-separated insulation to twist the conductor strands to provide the finished wire.

The reciprocating bar stripping machines, as disclosed in U.S. Pat. No. 3,994,188 and U.S. Pat. No. 4,009,738, both to Baba et al, can simultaneously strip the insulation from and twist the conductor strands of a plurality of wires. These machines include first and second insulation cutting blades that overlie one another in adjacent planes and are mounted on a support for movement between an open, spaced-apart position and a closed, operative position in which the blades converge on the wires from opposite sides. Each blade carries sharpened V-notches with the blades defining complementary notch sets for each wire to be stripped. When the blades converge on the wires, the cutting edges of each V-notch set cut or score the insulation on each wire in four zones distributed about the periphery of the wire with the cut-plane including both cut and partially cut portions. After the cutting step, first and second bars grip the so-cut end of the wires from opposite sides and are caused to move in opposite lateral directions of the wires as the wires are pulled from the machine. The insulation on each wire is separated at its respective cut-plane and pulled from the wire as it is rotated to twist the conductor strands.

Each of the two general types of stripping machines have various advantages and drawbacks. The rotating head machine, by providing an encircling cut about the entire periphery of the insulated wire, permits the insulation to be separated cleanly in its cut-plane without undue tearing. However, since the stripping head must rotate about a wire axis to provide the encircling cut, the rotating head machines are best suited for stripping insulation from a single wire and have limited efficacy for stripping insulation from a plurality of wires, for example, the two wires extending from the end of a electrical power cord. The reciprocating bar machines, on the other hand, can strip the insulation from a plurality of wires but cannot provide the encircling cut about the periphery of the wires that permits clean separation of the insulation. The cutting edges of the complementary V-notches leaves both cut and partially cut zones about the periphery of the insulation. As a result, the insulation, as it is separated in its cut plane, can tear unevenly and leave an irregular edge. From a practical standpoint, the use of V-notch blades requires each cutting edge to be precisely ground with respect to the other edges and that each of the wires be precisely aligned relative to the other and the various cutting edges. Any misalignment in the manufacture of the blades or in the presentation of the wires to the blades can cause the conductor strands to be cut by the cutting edges.

SUMMARY OF THE INVENTION

In view of the above, it is a broad, overall object of the present invention to provide a wire stripping machine which can simultaneously strip the insulation from the ends of a plurality of insulated wires which machine is simple in construction and provides improved performance when contrasted to prior wire stripping machines.

It is another object of the present invention to provide a wire stripping machine which can strip the insulation from the ends of a plurality of insulated wires and twist the conductor strands thereof which does not require separately operable insulation cutting and insulation rotating devices.

It is another object of the present invention to provide a wire stripping machine which can strip the insulation from the ends of a plurality of insulated wires which does not require the wires to be precisely aligned relative to the stripping machine cutting edges prior to the insulation cutting operation.

It is another object of the present invention to provide a wire stripping machine which can strip the insulation from the ends of a plurality of insulated wires which simultaneously provides an encircling cut around the periphery of each wire to be stripped to permit reliable separation of the insulation without undue tearing.

It is still another object of the present invention to provide a wire stripping machine which can strip the insulation from the ends of a plurality of stranded-core, insulated wires and twist the conductor strands thereof, which provides, in a single stripping element, a cutting edge for peripherally cutting the wire insulation and a wire contacting surface for rotating the so-cut insulation as it is removed from the wire to twist the conductor strands.

It is a further object of the present invention to provide a wire stripping machine which can strip the insulation from the ends of a plurality of stranded-core, insulated wires and twist the conductor strands thereof which provide means for separating the wire ends as they are presented to the stripping machine so that they lie laterally adjacent one another prior to the stripping and twisting operation.

It is still a further object of the present invention to provide an insulation stripping method for stripping the insulation from the ends of a plurality of stranded-core, insulated wires and twisting the exposed conductor strands.

In the fulfillment of these objects, and others, the present invention provides a insulation stripping machine for stripping the insulation from the ends of a plurality of insulated wires that includes first and second wire separating elements and wire stripping elements which are carried, respectively, on stripping heads that are movably mounted on a support means for movement between an open position and a closed, operative position. In the preferred embodiment, each wire separating element includes a rotatable separating disc and each wire stripping element includes an elongated stripping bar having a wire contacting surface one one side thereof and an insulation stripping knife associated with the stripping bar that presents a insulation cutting edge a selected distance above the wire contacting surface with the selected distance so-chosen that it is less than the wall thickness of the insulation to be stripped. The wire separating elements and the stripping elements are mounted on the stripping heads so that the respective wire separating discs, the wire contacting surfaces, and the cutting edges face each other. As the stripping heads move to their operative position, the discs separate the wire ends so that they lie adjacent one another with the wire contacting surfaces gripping the ends of the insulated wires therebetween across a wire stripping zone and the cutting edges penetrating the insulation on opposite sides of the wires. The stripping elements are then caused to move in opposite lateral directions of the restrained wires to cause the ends of the wires to roll relative to the wire contacting surfaces and rotate about their respective axes as the cutting edges effect an encircling cut in the insulation about the entire periphery of each wire. The closed stripping elements are then pulled from the end of the wires while the contacting surfaces continue their opposite lateral motion to simultaneously pull the peripherally cut insulation from the end of each wire and twist the exposed conductor strands.

BRIEF DESCRIPTION OF THE DRAWINGS

The above description, as well as the objects, features, and advantages of the present invention will be more fully appreciated by reference to the following detailed description of a presently preferred, but nonetheless illustrative, embodiment in accordance with the present invention, when taken in conjunction with the accompanying drawings wherein:

FIG. 1 is a front elevational view of an insulation stripping machine or work station in accordance with the present invention showing upper and lower stripping heads and a pair of pick-up arms with both the stripping heads and the pick-up arms shown in their respective open positions;

FIG. 1a is a fragmentary, front elevational view of the pick-up arms of FIG. 1 shown in their closed position;

FIG. 2 is a side elevational view, in cross-section, of the insulation stripping station shown in FIG. 1 taken along line 2—2 of FIG. 1;

FIG. 3 is a side elevational view, in cross-section, of the insulation stripping station of FIG. 1 showing the upper and lower stripping heads in their closed, operative position taken along the same line as in FIG. 2;

FIG. 5 is an exploded perspective view generally along the line 5—5 of FIG. 1 of the lower stripping head of FIGS. 1-3 with selected parts omitted for reasons of clarity;

FIG. 5a is an enlarged detail, in perspective, of a portion of the stripping bar illustrated in FIG. 5 showing a serrated wire contacting surface;

DETAILED DESCRIPTION OF THE PREFERRED EMBODIMENT

Figure 4:
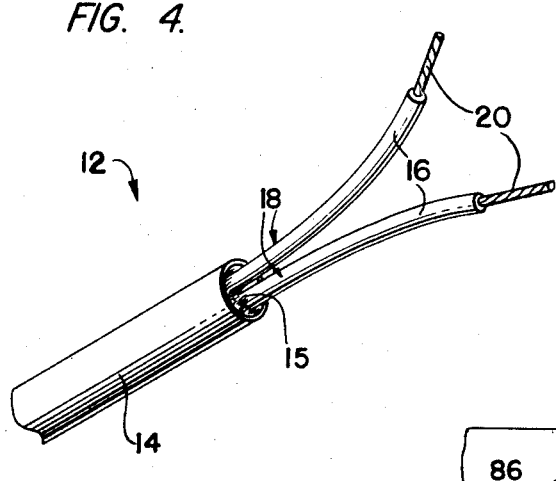
FIG. 4 is a perspective view of the end of a power cord having the insulation removed from the end of its wires and the exposed conductor strands twisted.

A preferred embodiment of an insulation stripping machine or station in accordance with the present invention is shown in FIGS. 1, 2, and 3 and is generally designated by the reference character 10. The insulation stripping station 10 is preferably part of a power-cord manufacturing line (not shown) that includes a plurality of individual wire-working stations. The manufacturing line is designed to accept a length of power cord severed from a supply reel and prepare one or both ends of the cord to provide, as shown in FIG. 4, a power cord end 12 having a portion of its outer sheath or jacket 14 removed, the jute filler-strings 15 (shown only in FIG. 4) severed at the end of the jacket, a length of the insulation 16 at the ends of the wires 18 removed, and the conductor strands 20 helically twisted. The so-prepared power cord may then be further processed, e.g., by crimping the twisted conductor strands 20 to an electrical terminal (not shown) or tinning the conductor strands in preparation for a subsequent soldering step. An exemplary manufacturing line would include a machine for unwinding and severing successive lengths of power cord from a supply reel and loading the so-severed power cords onto an indexing conveyor, for example, a wire conveyor of the type manufactured by the Artos Engineering Co., of New Berlin, Wisconsin, which secures the power cord ends 12 in clamps and indexes the cords, in a step-by-step sequence, to a first work station which removes a portion of the outer jacket 14, to a second work station which unwraps and removes the jute filler-strings 15, to a third work station which unwraps the helically wrapped wires 18, and to the insulation stripping station 10 of the present invention which removes a selected length of the insulation 16 from the ends of the wires 18 and twists the conductor strands 20 to provide the prepared power cord end 12 as shown in FIG. 4.

As shown in FIG. 1, the insulation stripping station 10 includes a lower stripping head 22 and an upper head 24 both of which are mounted on a vertically aligned support shaft 26 (FIGS. 2 and 3) for movement in the vertical direction between an open position as shown in FIG. 1 and 2 and a closed, operative position as shown in FIG. 3 and a pair of power cord pick-up arms 28 and 30 which are movable between an open position indicated by the solid-line illustration in FIG. 1 and a closed position as indicated by the broken-line illustration in FIG. 1 and the detailed view of FIG. 1a.

As shown in FIGS. 2 and 3, the stripping heads 22 and 24 and their support shaft 26 are connected, at the midpoint of the support shaft 26, to a horizontally aligned slide bar 32 which, in turn, is mounted for horizontal reciprocating movement in the guideways of a stationary slide block (not shown). The stripping heads 22 and 24 can advance in the horizontal direction from an initial or starting position represented by the line 34 in FIGS. 2 and 3 in the direction of the arrow 36 to a working position indicated by the line 38 and then retract from the working position in the direction of the arrow 40 to the initial position. When the lower and upper stripping heads 22 and 24 are in their working position, they are adapted to engage a power cord end 12 extending outwardly from a power cord conveyor clamp 42 (broken-line illustration) along a machine axis 44. A double-acting pneumatic cylinder and associated connecting linkages, schematically represented by the reference character 46 in FIG. 2, is preferred to effect the bi-directional movement of the slide bar 32. Other actuators suitable for this function and also suitable for the various actuator functions described below include, but are not limited to, single and double-acting hydraulic, electrical, and electro-mechanical actuators.

As shown in FIG. 1, the pick-up arms 28 and 30 are symmetrically mounted on opposite sides of a vertical center line 48 of the stripping station 10 with each arm secured at one end thereof to, respectively, a shaft 50 and another shaft 52. Each pick-up arm 28 and 30 includes an arcuate section 54 which intersects with and joins a second arcuate section 56. The first arcuate section 54 of each pick-up arm 28 and 30 presents an exteriorly curved surface 58 and the second arcuate section 56 presents an interiorly curved surface 60 to the machine axis 44 with the intersection of these two curved surfaces on each arm being radiused by an amount "r", as shown in the detailed view of FIG. 1a. The radius "r" is approximately equal to, and preferably somewhat larger than, the radius of the power cord end 12.

The pick-up arms 28 and 30 are provided to locate the power cord end 12 in front of the stripping station 10 and align it along the machine axis 44. This operation is necessary since the power cord end 12 is cantilevered from the end of the conveyor clamp 42 by a distance "d", as shown in FIG. 2, with the distance "d" typically equal to three inches (approximately 7.6 cm.); and, as a practical matter, the power cord end 12 extends in an off-axis direction because the cord end, being flexible, 37 droops" below the machine axis 44 under the influence of gravity and/or the cord end retains a mechanical set induced into the cord by one of the prior manufacturing steps. The pick-up arms 28 and 30, as they are actuated toward their closed position by the rotation of their respective support shafts 50 and 52 in the direction of, respectively, arrows 62 and 64, sweep through an area in a sweep plane 66 (FIG. 2) in front of the stripping heads 22 and 24. As the pick-up arms 28 and 30 move towards their closed position, one of the curved surfaces, that is, the exteriorly curved surface 58 or the interiorly curved surface 60 of the arms contacts the power cord end 12 and moves it toward the machine axis 44. When the pick-up arms 28 and 30 reach their closed position, the power cord end 12 is restrained along the machine axis 44 in the opening defined between the radiused intersections of the two pick-up arms 28 and 30 as shown in FIG. 1a.

Figure 6:
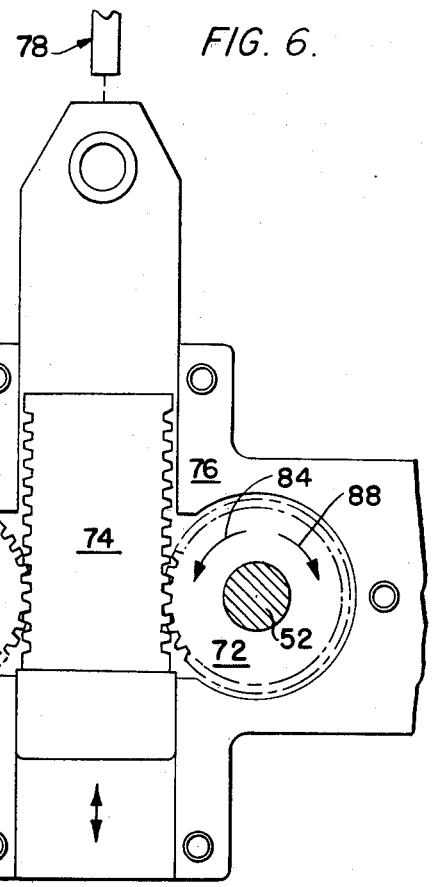
FIG. 6 is a front elevational view, in partial cross-section, of a rack and pinion gear-set actuator for operating the pick-up arms shown in FIGS. 1 and 2.

In the preferred embodiment, a rack and gear device 68, as shown in frontal cross-section in FIG. 6, is preferred for actuating the pick-up arms 28 and 30 to and from their open and closed positions. The shafts 50 and 52, which are secured at one end to their respective pick-up arms 28 and 30, are secured at their other end to pinion gears 70 and 72 which, in turn, engage the teeth on opposite sides of a double rack 74. A housing 76, connected to the stationary slide block (not shown) that also supports the horizontal slide 32 (FIGS. 2 and 3), supports the rack 74 for reciprocating movement in the vertical direction in FIG. 6 with a double-acting pneumatic cylinder, schematically represented in FIG. 6 by the reference character 78, connected to the rack 74. When the rack 74 is urged downwardly, the pinions 70 and 72 rotate, respectively, in the direction of the arrows 82 and 84 causing the pick-up arms 28 and 30 to close; and, conversely, when the rack 74 is urged upwardly, the pinions 70 and 72 each rotate in the opposite direction, that is, in the direction of arrows 86 and 88, to cause the pick-up arms to move to their open position. An adjustable mechanical stop (not shown) is provided to limit the motion of the rack 74 and thereby establish the open and closed positions of the pick-up arms 28 and 30. While the double-acting pneumatic cylinder 78 and the rack and the gear device 68 have been shown as the preferred drive for the pick-up arms 28 and 30, other drive arrangements are equally suitable including, but not limited to, other types of gear sets and various types of pivoted link arrangements driven by double-acting fluid cylinders, single-acting fluid cylinders in cooperation with return springs, and various types of electrical and electro-mechanical actuators.

The lower and upper heads 22 and 24 are similarly constructed with the differences between the two heads explained below. In the figures, similar elements of the lower and upper stripping heads 22 and 24 are identified, respectively, by unprimed and primed reference characters. An understanding of the construction of each stripping head 22 and 24 may be obtained by reference to FIG. 5 which shows the essential elements of the lower stripping head 22 in exploded perspective and by reference to FIG. 1, 2, and 3 which show the essential elements of the lower and upper stripping heads in their assembled relationship. As shown in FIG. 5, each stripping head includes a carrier 90 that supports a wire aligning assembly 92 and a stripping element 94.

The wire aligning assembly 92 is designed to align and hold the power cord end 12 as the stripping heads 22 and 24 move to their closed position and separate the wires 18 so that they lie laterally adjacent to one another. The aligning assembly 92 includes a guide plate 96 that is secured against the side of a support plate 98 by a pin 100 and another pin 102 which pass, respectively, through bores 104 and 106 and through bores 108 and 110 formed through the plates 96 and 98.

The guide plate 96 includes two oppositely inclined guide edges 112 and 114 that originate at a wire guiding groove 116 and diverge outwardly at a selected angle (e.g., 90°) from one another. The support plate 98 includes a wire guiding groove 118 that is formed at substantially the same radius as and in registration with the wire guiding groove 116 formed in the guide plate 96.

A separating disc 120, the function of which is described in more detail below, is rotatably mounted on an extension of the pin 100 that extends outwardly from the support plate 98 on the side opposite the guide plate 96.

The entire wire aligning assembly 92 is mounted in a channel-like guideway 122 formed in the carrier 90 with the support plate 98 adapted to abut against and slide relative to the bottom surface 124 of the guideway 122. The aligning assembly 92 is retained in the guideway 122 for reciprocating movement in the direction indicated by the double arrow 126 by retainer plates 128 and 130 which are secured to the carrier 90 by threaded fasteners 132. The wire aligning assembly 92 is resiliently urged in the upward direction in FIG. 5 by a coil spring 134, in tension, that extends between a pin 136 secured to the support plate 98 and another pin 138 secured to the bottom of a channel 140 formed in the guideway 122. As shown in the cross-sectional views of FIGS. 2 and 3, the upper position of the wire aligning assembly 92 is established and limited by the pin 100 which contacts the upper end of the channel 140. As can be appreciated, a force applied to the wire aligning assembly 92 in the downward direction in FIG. 5 causes the entire wire aligning assembly to move downwardly with the spring 134 returning the wire aligning assembly to its initial upward position when the force is removed.

Figure 7:
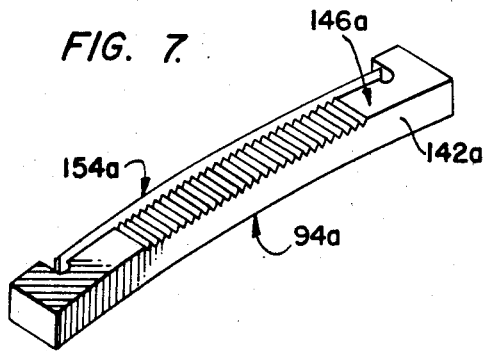
FIG. 7 is a perspective view of an alternate embodiment of a stripping element in which the wire contact surface is formed as an arcuate surface.

The stripping element 94 includes a stripping bar 142 that has a stripping knife 144 fastened to one side. In the preferred embodiment, the stripping bar 142 is formed as a straight, elongated member having a square or rectangular cross-section with a flat, upper wire contact surface 146 and side extensions 148 formed at each end of the bar. In the alternative, and as shown in FIG. 7, a stripping element 94a may be formed from a curved stripping bar 142a having an arcuate wire contact surface 146a. As shown in FIG. 5, the upper surface 146 of the stripping bar 142 is preferably formed with surface irregularities to enhance the frictional contact between the wire contact surface 146 and the insulation 16 of the wires 18. In the preferred embodiment, the upper surface 146 of the bar 142 is provided with a plurality of recurring ridges 150 and grooves 152, as shown in the enlarged detail of FIG. 5a, that are transverse to the longitudinal axis of the bar 142 to define a serrated wire contact surface. As can be appreciated, other types of surface irregularities that enhance frictional contact with the insulated wire are suitable.

The stripping knife 144 is formed from flat stock and is sharpened along one edge to provide an insulation cutting edge 154. The knife 144 is fastened to the side of the stripping bar 142 by shoulder screws 156 which pass through inclined slots 158 formed at each end of the knife. The knife edge 154 is coextensive with some and preferably the entire wire contact surface 146 with the edge positioned above the wire contact surface by an average distance that is less than the wall thickness of the insulation to be stripped.

Figure 13:
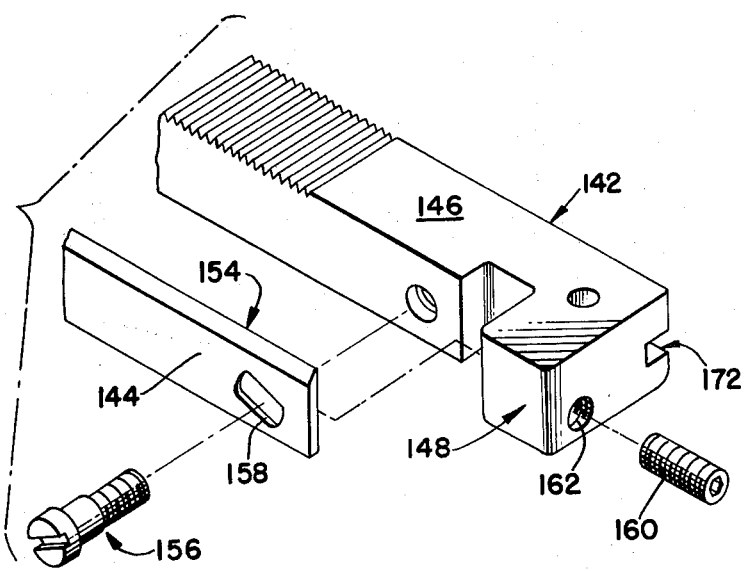
FIG. 13 is an enlarged detailed view, in partial exploded perspective, of the end of the stripping element illustrated in FIG. 5.

As shown in the enlarged detail of FIG. 13, the position of the knife edge 154 relative to the wire contact surface 146 can be adjusted by set screws 160 which pass through threaded bores 162 formed in the side extensions 148. The bores 162 are formed such that the set screws 160 are aligned along the longitudinal axis of the knife 144 with the end of the set screws 160 adapted to contact the side edge of the knife 144 as shown in FIG. 1. The set screws 160 may be advanced or retracted, as required, to cause the knife 144 to shift to the right or the left (FIG. 1) relative to the stripping bar 142 to raise or lower the position of the knife edge 154 relative to the wire contact surface 146. The angle of inclination of the slots 158 relative to the knife edge 154 is selected such that very small adjustments of the knife edge position relative to the wire contact surface 146 can be effected by appropriate rotation of the set screws 160.

The stripping bar 142 and the knife 144 are mounted on an upper surface 164 of the carrier 90 for reciprocating movement in the direction indicated by the arrow 166 in FIG. 5. The stripping bar 142 and the knife 144 are retained in place by the wire aligning assembly 92 on one side of the stripping knife 144 and a retainer plate 168 on the side opposite from the stripping knife 144. The retainer plate 168 is secured to the upper surface 164 of the carrier 90 by suitable threaded fasteners and includes a key-like projection 170 that extends into a keyway 172 formed in the stripping bar 142 on the side opposite the stripping knife 144.

As shown in FIG. 1, the stripping assembly 94 of the lower stripping head 22 is resiliently urged in the direction of the arrow 174 by a return spring 176, in tension, which is connected between a depending pin 178 secured to the carrier 90 and the depending tab 180 of a spring arm extension 182 secured to the end of the stripping bar 142. A downwardly depending lug 184 formed on the spring arm extension 182 is adapted to contact a side surface of the carrier 90 and act as a positive mechanical stop to establish the initial position of the stripping element 94. The stripping element 94' of the upper stripping head 24, as shown in FIG. 1, is resiliently urged in the direction opposite to that of the stripping assembly 94 of the lower stripping head 22, that is, in the direction of the arrow 186 by a similar spring arm extension 182' and return spring 176' arrangement.

Figure 8:
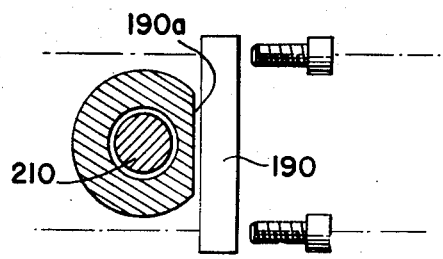
FIG. 8 is a detailed view, in cross-section of a keying arrangement that allows each stripping head to reciprocate axially between two stops along a guide shaft without any rotation of the heads.

As shown in FIGS. 2 and 3, the guide shaft 26 extends through a mounting bore 188 in the lower carrier 90 and a mounting bore 188' in the upper carrier 90' such that the lower and upper stripping heads 22 and 24 are aligned on the guide shaft 26 with the separating discs 120 and 120', the knife edges 154 and 154', and the wire contact surfaces 146 and 146' opposing or facing each other in common, respective, planes. The guide plates 96 and 96' of the lower and upper stripping heads 22 and 24 are mounted in adjacent planes such that the two guide plates overlie each other, as shown in FIG. 3, when the stripping heads 22 and 24 are in their operative position. The stripping heads 22 and 24 are mounted on the guide shaft 26 such that they can reciprocate along the shaft 26 but cannot rotate relative to one another or to the shaft 26. A preferable mounting arrangement, as shown in the detail of FIG. 8, provides for a retainer plate 190 secured at each end by suitable threaded fasteners to the carrier 90 with one side of the retainer plate 190 bearing against a flat surface 190a formed on the side of the support shaft 26.

Figure 12:
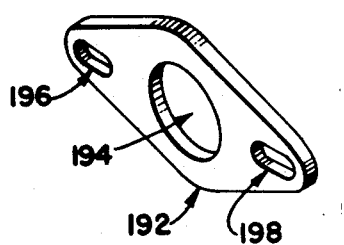
FIG. 12 is a perspective view, in reduced scale, of a coupling link for connecting the upper and lower stripping heads for equal and opposite motion about the machine axis.

The stripping heads 22 and 24 are connected together by a mechanical link 192 shown in FIGS. 2, 3 and 12 such that an opening or closing force applied to one of the stripping heads will be transmitted to the other to cause both stripping heads to move simultaneously toward their open or their closed, operative position about the machine axis 44. The link which is partially obscured in FIG. 1 by the lower and upper stripping heads 22 and 24, is shown in reduced scale in FIG. 12 and includes a central bore 194 and two elongated slots 196 and 198 at opposite ends of the link. The link 192 is journalled through its central bore 194 on a cylindrical surface portion 200 of the horizontal slide 32 (FIGS. 2 and 3) with the slots 196 and 198 engaging two pins (not shown) that extend outwardly from, respectively, the lower and upper carriers 90 and 90'. A force applied to one of the stripping heads causes the link 192 to rotate relative the cylindrical surface 200 and transmit the force to the other stripping head. As a result, the stripping heads 22 and 24 are connected together by the link 192 for simultaneous movement between the open and closed positions.

The separation distance between the stripping heads 22 and 24 in their closed position is determined by an adjustable screw 202 (FIGS. 2 and 3) that passes through a threaded bore formed in a flange 204' extending outwardly from the upper carrier 90' with the bottom, distal end of the screw 202 adapted to contact the cylindrical surface portion 200 of the horizontal slide 32 to establish the separation distance between the two stripping heads. A locking device, such as a locknut 206, is provided to prevent unintentional loosening of the adjusting screw 202.

A pneumatic cylinder 208 (FIG. 1) is provided to apply an opening or a closing force to the stripping heads 22 and 24 to move them between the open and closed positions. The cylinder 208 is mounted on the upper stripping head 24 and includes a downwardly extending ram 210 (FIGS. 2 and 3) that passes through a central bore 212 formed through the support shaft 26 with the lower end of the ram 210 connected to a flanged end 214 of the lower carrier 90 through a retaining cap 216 and a threaded fastener 218. When the cylinder 208 applies an upwardly directed force to the lower stripping head 22, as indicated by the arrow 220 in FIG. 2, the lower stripping head 22 moves upwardly towards the closed, operative position with the coupling link 192 rotating about the cylindrical surface 200 to move the upper stripping head 24 downwardly towards the closed position. The movement of the lower and upper stripping heads 22 and 24 is stopped when the bottom end of the adjusting screw 202 contacts the cylindrical surface 200 with the opposing knife edges 154 and 154' and the wire contact surfaces 146 and 146' defining a wire stripping zone therebetween.

Actuator arrangements other than the pneumatic cylinder 208 described above may be used to effect the opening and closing of the stripping heads 22 and 24. For example, a double-acting fluid actuator, either hydraulic or pneumatic, or a single-acting fluid actuator and a cooperating return spring can be coupled to each stripping head to provide the opening and closing forces. Also, various types of electrical and electromechanical actuators are likewise suitable.

The insulation stripping station 10, prior to the initiation of the stripping cycle, has its lower and upper stripping heads 22 and 24 and the pick-up arms 28 and 30 in their respective open positions. The power cord end 12, which has a portion of its outer jacket 14 removed, the jute-filler strings 15 severed at the end of the outer jacket, and the wires 18 unwrapped, is restrained by the conveyor clamp 42 on the machine axis 44 with the cantilevered portion of the power cord end extending from the clamp toward the work station 10. The power cord end 12 is usually in an off-axis location, as previously explained, because of a mechanical set induced in the wire during a previous manufacturing operation or the weight of the wire end causing it to drop below the machine axis 44.

At the start of the stripping station 10 operating cycle, the pneumatic cylinder 78 (FIG. 6) is operated to drive the rack 74 downwardly in FIG. 6 to rotate the pinions 70 and 72 and their respective support shafts 50 and 52 in the direction, respectively, of arrows 82 and 84 to cause the pick-up arms 28 and 30 to move from their open position in the direction of arrows 62 and 64 to their closed position. As the pick-up arms 28 and 30 sweep through the sweep plane 66 in front of the stripping station 10, one of the curved surfaces, 58 or 60, contacts the power cord end 12 and moves it so that it is substantially coincident with the machine axis 44 when the pick-up arms reach their closed positions.

After the power cord end 12 is secured in place along the machine axis 44, the pneumatic cylinder 46 (FIG. 2) is operated to cause the horizontal slide 32 and the attached support shaft 26 and stripping heads 22 and 24 to advance from their initial position indicated by the line 34 in FIGS. 2 and 3 in the direction of the arrow 36 to the working position as indicated by the line 38 and the wires 18 extending into the wire stripping zone.

Thereafter, the pneumatic cylinder 208 is operated to apply an upwardly directed closing force through the ram 210 to the lower stripping head 22. This force is transmitted through the coupling link 192 to the upper head 24 with the two heads moving simultaneously toward their closed, operative position. As the lower and upper stripping heads 22 and 24 converge on the wires 18, the inclined side surfaces 112, 114, 112', and 114' of the overlapping guide plates 96 and 96' assist in guiding the wires 18 into the opening defined between the grooves 116 and 116' on the guide plates 96 and 96' and defined between the grooves 118 and 118' of the support plates 98 and 98'.

Figure 9A:
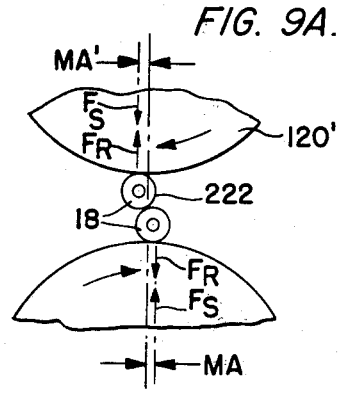
FIG. 9a is a partial, front elevational view of the wire separating discs of the upper and lower stripping heads converging on a pair of misaligned wires, with selected parts omitted or shown in fragmentary form for reasons of clarity.
Figure 9B:
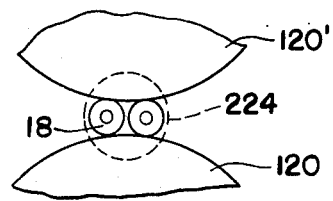
FIG. 9b is a front elevational view, similar to FIG. 9a showing the misaligned wires of FIG. 9a in their final, aligned position about the machine axis.

The separating discs 120 and 120', while the upper and lower stripping heads 24 and 22 are closing, operate to separate the wires 18 so that they lie in a generally horizontal plane in the wire stripping zone laterally adjacent to one another. A percentage of the wires 18 that are presented to the stripping station 10 do not lie laterally adjacent to one another in a side-by-side relationship and can lie at various attitudes, including the case, as shown in FIG. 9a, where one wire is located above and partially overlying the other wire. The separating discs 120 and 120', as they move towards one another, contact and apply a separating force $F_S$ and $F_S'$ to the misaligned wires 18; and the wires apply an equal and opposite reaction force $F_R$ and $F_R'$ to the separating discs 120 and 120'. The line of action of the forces $F_S$ and $F_R$ is a function of the position of the wires 18 relative to a line 222 extending between the axis of rotation of the two separating discs 120 and 120'. In the case shown in FIG. 9A, the line of action of the forces $F_S$ and $F_R$ and $F_S'$ and $F_R'$ is offset or displaced from the line 222, respectively, by an amount MA and MA'; with these distances representing the moment arms of the respective forces. As a result, torques are developed about each separating disc 120 and 120' to cause the discs to rotate as shown in FIG. 9A with the so-rotating discs carrying each misaligned wire in opposite lateral directions. As the separating discs 120 and 120' continue to close, the realigned wires 18 are constrained, as shown in FIG. 9B, in the opening 224 (broken line illustration) defined by the grooves 116 and 116' and 118 and 118' of the lower and upper guide and support plates 96 and 96' and 98 and 98'.

While separating discs 120 and 120' have been shown as the preferred wire separating elements, as can be appreciated, appropriately supported portions of a disc, cylinder, or drum-like element, are equally suitable and other separation elements having movable surface configurations designed to provide the necessary lateral movement of the wires 18 are also suitable.

Figure 10:
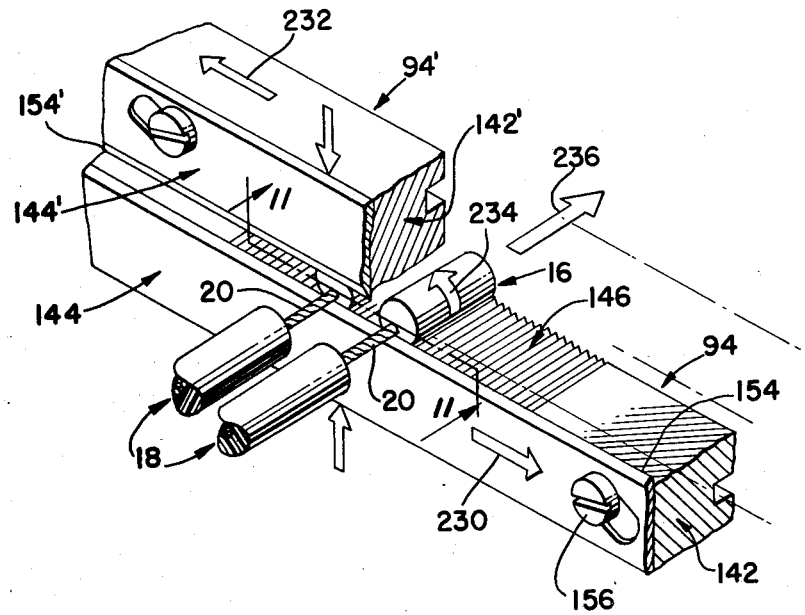
FIG. 10 is an enlarged detailed view, in fragmentary perspective, of the stripping bars of the upper and lower stripping heads of FIGS. 1-3 and FIG. 5.
Figure 11:
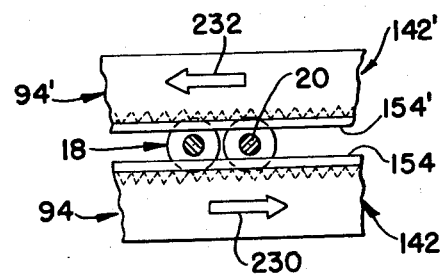
FIG. 11 is a partial, front elevational view of the stripping elements of FIG. 10 taken along line 11—11 of FIG. 10.

When the lower and upper stripping heads 22 and 24 reach their closed position, as shown in the partial perspective of FIG. 10 and in the detail of FIG. 11, the knife edges 154 and 154' penetrate the insulation 16 on the upper and lower sides of the wires 18 with the contact surfaces 146 and 146' gripping the insulation of the wires 18 therebetween. The depth to which the knife edges 154 and 154' penetrate the insulation 16 is adjusted so that it is less than the wall thickness of the insulation to prevent nicking or damage to the conductor strands 20.

As described above, each of the stripping elements 94 and 94' are adapted to reciprocate along their respective longitudinal axes and are preferably operated, respectively, by pneumatic cylinders 226 and 228 as schematically represented in FIG. 1. After the lower and upper stripping heads 22 and 24 have reached the closed, operative position, the pneumatic actuators 226 and 228 are operated to move the stripping elements 94 and 94' in opposite lateral directions at equal rates of movements as indicated by the arrows 230 and 232 in FIGS. 10 and 11. As the stripping elements 94 and 94' move in their respective opposite lateral directions, the ends of the wires 18 are caused to rotate about their respective axes as indicated by the arrow 234 and roll relative to the wire contact surfaces 146 and 146'. As the wire ends rotate, the knife edges 154 and 154' peripherally cut around the entire periphery of the insulation 18 to the depth determined by the distance between the cutting edges 154 and 154' and the wire contact surfaces 146 and 146'. After the peripheral cutting of the insulation 18 is effected, and as the stripping elements 94 and 94' continue their opposite lateral motion, the pneumatic actuator 46 (FIG. 2) is operated to retract the horizontal slide 32, the support shaft 26, and the closed lower and upper stripping heads 22 and 24 in the direction of the arrow 236 in FIG. 10 and the arrow 40 in FIGS. 2 and 3 from the working position to the initial position. The combination of the rotational motion of the severed insulation 16 at the end of the wires 18 caused by the laterally moving upper and lower stripping elements 94 and 94' and the retraction of the slide 32 causes the severed insulation to separate in the cut plane and helically twist the conductor strands 20 and pull the so-cut insulation from the ends of the wires 18 to provide the finished power cord end 12 as shown in FIG. 4.

After the insulation 16 is stripped from the ends of the power cord wires 18, the pneumatic actuators 226 and 228 connected to the stripping elements 94 and 94' are deactivated causing the return springs 174 and 174' to return their respective stripping elements to their respective initial positions and the pneumatic cylinder 208 is operated to return the lower and upper stripping heads 22 and 24 to their open position. While pneumatic cylinders 226 and 228 have been shown connected to the stripping element 94 and 94', as discussed above, various types of actuators including single- and double-acting fluid actuators and electrical and electromechanical actuators are suitable for this purpose.

The various sub-operations of the stripping heads 22 and 24 can be modified or varied and still be effective to remove the insulation 16 from the ends of the wires 18. As the stripping elements 94 and 94' move in their opposite lateral directions, the cutting knives 154 and 154' are effective to peripherally cut the insulation 16. Although the amount of lateral movement of the stripping elements 94 and 94' can be varied, it is preferable to cut the entire periphery of the insulation 16 at least once and, if desired, the lateral motion can be continued to cause the knife edges 154 and 154' to make several passes through the cut line to ensure complete cutting of the insulation 16. In the preferred embodiment described above, the lateral motion of the stripping elements 94 and 94' is continued while the horizontal slide 32 is retracted to the initial position to helically twist the conductor strands 20. In some cases, for example, where solid-core wire is being stripped, it may not be desired to effect the twisting motion of the severed insulation and, of course, the lateral motion of the stripping elements 94 and 94' can be halted prior to retracting the stripping heads 22 and 24 to the initial position. Also, the preferred embodiment describes lower and upper stripping heads 22 and 24 to perform the stripping and twisting operations. However, a single notched stripping head operating to constrain the end of the wires 18 against an anvil-type surface rather than another complementary stripping element can be effective to strip the insulation.

While a sharpened knife edge has been disclosed as the preferred insulation cutting or separating device, other separating or cutting devices, such as a heated edge are contemplated as being within the scope of the invention.

There are a number of control arrangements known in the art of effecting timed control of the various actuators. For example, each actuator can be connected to a source of pressurized fluid through a control valve with the control member of each valve driven by an adjustable cam lobe with all the cam lobes carried on a common rotatable shaft. The operating cycle of the individual actuators may be varied by varying the respective cam lobe profiles, and the timing relationships between the various actuators may be varied by varying the relative position of the cam lobes on the common shaft. In the alternative, various electronic and electromechanical controls may be used.

The insulation stripping station 10 of the present invention provides a device for quickly and effieciently removing the insulation and twisting the conductor strands from a plurality of wires in which the stripping operation and the twisting operation is performed by the same simply constructed elements without the need for complex driving or synchronizing mechanisms and, as will be apparent to those skilled in the art, various changes and modifications may be made to the insulation stripping station of the present invention without departing from the spirit and scope of the present invention as recited in the appended claims and their legal equivalent.

What is claimed is:

1. An apparatus for simultaneously stripping the insulation from the ends of a plurality of insulated wires comprising:

insulation stripping means including first and second wire contact surfaces and an insulation cutting means associated with at least one of said wire contact surfaces, said wire contact surfaces adapted to contact the sides of a plurality of insulated wires and restrain the wires therebetween in a wire stripping zone and said insulation cutting means adapted to at least partially penetrate the insulation on a side of the restrained wires, said insulation cutting means being at least partially co-extensive with its respective wire contact surface;

wire separating means including first and second wire separating elements associated, respectively, with said first and said second wire contact surfaces for separating a plurality of wires so that they lie laterally adjacent one another;

support means for supporting said insulation stripping means and for supporting said wire separating means such that said first wire contact surface and its associated first separating element and said second wire contact surface and its associated second separating element are movable relative to each other to and from a closed, operative position in which said wire separating means is effective to separate a plurality of insulated wires so that they lie laterally adjacent one another and said wire contact surfaces are effective to contact and restrain the wires therebetween in said wire stripping zone and said insulation cutting means is effective to at least partially penetrate the insulation on at least one side of the wires, said support means also supporting at least one of said wire contact surfaces for movement relative to the other wire contact surface to cause the restrained wires to rotate thereby causing said insulation cutting means to at least partially peripherally cut the insulation of the wires;

first drive means for moving said first wire contact surface and first wire separating element and said second wire contact surface and said second wire separating element to said closed, operative position;

second drive means for moving at least one of said wire contact surfaces relative to the other to rotate the wires and cause said insulation cutting means to at least partially peripherally cut the insulation of the wires; and third drive means for separating, in a direction axially of the wires, the wires and the closed wire contact surfaces to remove the peripherally cut insulation from the wires.

2. An apparatus for simultaneously stripping the insulation from the ends of a plurality of stranded-core, insulated wires and twisting the conductor strands comprising:

an insulation stripping means including first and second wire contact surfaces and an insulation cutting means associated with at least one of said wire contact surfaces, said contact surfaces adapted to contact the sides of a plurality of insulated wires and restrain the wires therebetween in a wire stripping zone and said insulation cutting means adapted to at least partially penetrate the insulation on a side of the restrained wires, said insulation cutting means at least partially co-extensive with its respective wire contact surface;

wire separating means including first and second rotatably mounted wire separating discs for separating a plurality of wires so that they lie laterally adjacent one another;

support means including a first stripping head for supporting said first wire contact surface and said first wire separating disc and a second stripping head for supporting said second wire contact surface and said second wire separating disc, said stripping heads supported by said support means for movement relative to each other to and from an operative position in which said wire separating discs are effective to separate a plurality of insulated wires so they lie laterally adjacent one another and said wire contact surfaces are adapted to contact opposite sides of the wires and restrain the wires in said wire stripping zone defined between said wire contact surfaces and said insulation cutting means is effective to at least partially cut through the insulation on at least one side of the wires, said support means also supporting said wire contact surfaces for movement relative to each other in opposite directions laterally of the wires in said wire stripping zone;

first drive means for moving said first and said second stripping heads to said operative position to cause said wire separating discs to contact the wires and apply a separating force to the wires to cause them to move to a position laterally adjacent one another and to cause said wire contact surfaces to contact opposite sides of the insulated wires in said wire stripping zone to restrain the wires therebetween, said insulation cutting means at least partially penetrating the insulating on at least one side of the wires;

second drive means for moving said first and second wire contact surfaces, when said first and second stripping heads are in said operative position, in opposite lateral directions whereby the wires in the wire stripping zone are rotated about their respective wire axes by said lateral movement to cause said insulation cutting means to at least partially peripherally cut the insulation; and third drive means for separating, in a direction axially of the wires in the wire stripping zone, the wires and the closed stripping heads, while said second drive means is operative, to remove the peripherally cut insulation from the wires and twist the conductor strands thereof.

3. The apparatus claimed in claim 1 or claim 2 wherein:

said insulation cutting means is associated with both said first and second wire contact surfaces for at least partially penetrating the insulation on opposite sides of a plurality of insulated wires in said wire stripping zone.

4. The apparatus claimed in claim 1 or claim 2 wherein:

at least one of said first and said second wire contact surfaces is supported by said support means for movement laterally of the wires in said wire stripping zone.

5. The apparatus claimed in claim 1 wherein:

both of said first and said second wire contact surfaces are supported by said support means for movement laterally of the wires in said wire stripping zone; and said second drive means is adapted to move said first and said second wire contact surfaces in opposite lateral directions.

6. The apparatus claimed in claim 2 wherein said wire separating means comprise:

a first rotatably mounted disc associated with said first wire contact surface; and a second rotatably mounted disc associated with said second wire contact surface.

7. An apparatus for stripping the insulation from the ends of a plurality of insulated wires comprising:

first and second stripping elements each of which includes a substantially straight wire contact surface on one side thereof, at least one of said stripping elements having an insulation cutting knife secured thereto, said insulation cutting knife having a cutting edge that is at least partially co-extensive with said wire contact surface and which is located a selected distance above said wire contact surface, said wire contact surface adapted to contact the outer surface of a plurality of insulated wires while said cutting edge is adapted to at least partially penentrate the insulation on a side of the wires to a depth substantially equal to said selected distance;

first and second rotatably mounted wire separating discs for separating a plurality of wires so that they lie laterally adjacent one another;

support means including a first stripping head for supporting said first stripping element and said first wire separating disc and a second stripping head for supporting said second stripping element and said second wire separating disc, said stripping heads supported by said support means for movement relative to each other to and from an operative position in which said wire separating discs are effective to separate a plurality of insulated wires so they lie laterally adjacent one another and said wire contact surfaces are adapted to contact and restrain the wires in a wire stripping zone defined between said wire contact surfaces and said cutting edge is effective to at least partially cut through the insulation on a side of the wires, said support means also supporting at least one of said stripping elements for movement relative to each other to cause the restrained wires to rotate and said cutting edge to at least partially peripherally cut the insulation of the wires;

first drive means for moving said first and said second stripping heads to said closed position to cause said wire separating discs to contact the wires and apply a separating force to the wires to cause them to move to a position laterally adjacent one another and to cause said wire contact surfaces to contact the insulated wires in said wire stripping zone to restrain the wires therebetween, said cutting edge at least partially penetrating the insulation on a side of the wires;

second drive means for moving at least one of said stripping elements relative to the other to rotate the wires about their respective wire axes to thereby cause said cutting edge to at least partially peripherally cut the insulation; and third device means for separating, in a direction axially of the wires, the wires and the closed stripping elements to remove the peripherally cut insulation from the end of the wires.

8. An apparatus for stripping the insulation from the ends of a plurality of stranded-core, insulated wires and twisting the conductor strands comprising:

first and second stripping bars each of which includes an elongated, substantially straight wire contact surface on one side thereof and an insulation cutting knife having a cutting edge that is at least partially co-extensive with said wire contact surface and which is located a selected distance above said wire contact surface, said wire contact surface adapted to contact one side of a plurality of insulated wires while said cutting edge is effective to at least partially penetrate the insulation on said one side of the wires to a depth substantially equal to said selected distance;

wire separating means including first and second wire separating discs associated, respectively, with said first and second wire contact surfaces for separating a plurality of wires so that they lie laterally adjacent one another;

support means for supporting said insulation stripping bars and for supporting said wire separating means such that said first wire contact surface and its associated first separating disc and said second wire contact surface and its associated second separating disc lie in respective, common planes and are movable relative to each other to and from an operative position in which position said wire separating means is effective to separate a plurality of insulated wires so that they lie laterally adjacent one another and said wire contact surfaces are effective to contact said restrain the wires therebetween and said insulation cutting knife is effective to at least partially penetrate the insulation on at least one side of the plural wires, said support means also supporting at least one of said wire contact surfaces for movement relative to the other wire contact surface to cause the restrained wires to rotate and thereby causing said insulation cutting knife to at least partially peripherally cut the insulation of the wires;

first drive means for moving said first wire contact surface and first wire separating disc and said second wire contact surface and second wire separating disc to said operative position;

second drive means for moving at least one of said wire contact surfaces relative to the other to rotate the wires and cause said insulation cutting knife to at least partially peripherally cut the insulation of the wires;

third drive means for separating, in a direction axially of the wires, the wires and the closed stripping bars, while said second drive means is operative, to thereby simultaneously remove the peripherally cut insulation from the end of the wire and rotate the peripherally cut insulation to twist the conductor strands.

9. The apparatus claimed in claim 7 or claim 8 wherein said first drive means comprises:

first fluid actuator means connected to said first and second stripping heads for selectively moving said stripping heads to and from said operative position.

10. The apparatus claimed in claim 7 or claim 8 further comprising:

adjustable mechanical stop means associated with said first and second wire contact surfaces to establish the width of said wire stripping zone defined between said first and said second wire contact surfaces when they are in their operative position.

11. The apparatus claimed in claim 7 wherein:

said first stripping element is mounted on a support surface of said first stripping head for reciprocation along an axis transverse to said wire axes; and said second stripping element is mounted on a support surface on said second stripping head for reciprocation in a direction parallel to the axis of movement of said first stripping element.

12. The apparatus claimed in claim 11 wherein:

said first stripping element is resiliently urged by a first biasing means in a first direction laterally of said wire axes;

said second stripping element is resiliently urged by a second biasing means in a second direction laterally of said wire axes, said first and said second directions opposite from one another.

13. The apparatus claimed in claim 12 further comprising:

a first mechanical stop connected to said first stripping element to establish an initial position for said first stripping element;

a second mechanical stop connected to said second stripping element to establish an initial position for said second stripping element;

said first and second biasing means resiliently urging, respectively, said first and said second stripping elements to their initial position established by said first and said second mechanical stops.

14. The apparatus claimed in claim 13 wherein said second drive means comprises:

second fluid actuator means connected to said first and to said second stripping elements to selectively move said first and second stripping elements, respectively, in said second and said first directions.

15. The apparatus claimed in claim 8 wherein:

said first stripping bar is movably mounted on said support means for reciprocation along an axis transverse to said wires axes; and said second stripping bar is movably mounted on said support means for reciprocation in a direction parallel to the axis of movement of said first stripping bar.

16. The apparatus claimed in claim 15 wherein:

said first stripping bar is resiliently urged by a first urging means in a first direction laterally of said wire axis;

said second stripping bar is resiliently urged by a second urging means in a second direction laterally of said wire axes, said first and said second directions opposite from one another.

17. The apparatus claimed in claim 16 further comprising:

a first mechanical stop connected to said first stripping bar to establish an initial position for said first stripping bar;

a second mechanical stop connected to said second stripping bar to establish an initial position for said second stripping bar;

said first and second urging means resiliently urging, respectively, said first and said second stripping bars to their initial position established by said first and said second mechanical stops.

18. The apparatus claimed in claim 17 wherein said second drive means comprises:

second fluid actuator means connected to said first and said second stripping bars to selectively move said first and second stripping bars, respectively, in said second and said first directions.

19. The apparatus claimed in claim 7 or claim 8 wherein:

said wire contact surfaces are formed with surface irregularities to enhance frictional engagement between the outer surface of the insulated wire and said wire contact surface.

20. The apparatus claimed in claim 19 wherein:

said surface irregularities comprise recurring ridges and grooves.

21. The apparatus claimed in claim 7 or claim 8 wherein said insulation cutting knife comprises:

a substantially flat blade having one straight edge thereof sharpened to constitute said cutting edge.

22. The apparatus claimed in claim 21 wherein:

said blade is adjustably mounted relative to said wire contact surface whereby the position of said cutting edge relative to said wire contact surface can be selectively adjusted.

23. The apparatus claimed in claim 7 or claim 8 wherein:

said wire separating discs are each rotatably mounted on a respective wire aligning assembly, each of said assemblies movably mounted in a guideway of said support means and resiliently urged in the direction of said wire stripping zone.

24. The apparatus claimed in claim 23 wherein:

each wire aligning assembly includes a wire guide having oppositely inclined wire guiding surfaces facing said wire stripping zone.

25. An apparatus for simultaneously stripping the insulation from the ends of a plurality of insulated wires comprising:

first and second wire stripping elements movably mounted on support means for movement to and from a wire stripping position in which position said wire stripping elements present opposed wire contacting surfaces for contacting and restraining a plurality of insulated wires in a wire stripping zone defined between said opposed wire contacting surfaces;

insulation cutting means associated with at least one of said wire stripping elements for at least partially cutting through the insulation of the wires in said wire stripping zone;

wire separating means associated with said wire stripping elements for separating a plurality of wires presented to said wire stripping elements so that the wires lie laterally adjacent one another; and drive means for causing said first and second wire stripping elements to move to said operative position in which said wire separating means is effective to separate the plural wires so they lie adjacent one another and said insulation cutting means is effective to at least partially cut the insulation of the wires, for causing said wire stripping elements to move laterally of said wires in said wire stripping zone to cause said insulation cutting means to at least peripherally cut the insulation of the wires, and for causing separation of said so-cut wires from said elements to remove the cut insulation.

26. The apparatus claimed in claim 25 wherein said drive means, when separating the cut insulation and the wires, is effective to rotate the cut insulation to twist the cut insulation relative to the wires.

27. The apparatus claimed in claim 25 wherein said wire separating means comprises:

first and second wire separating discs associated, respectively, with said first and second wire stripping elements for separating a plurality of wires so that they lie laterally adjacent one another.

28. The apparatus claimed in claim 27 wherein each of said wire separating disc is rotatably mounted on a support associated with the respective stripping element.

29. The apparatus claimed in claim 25 further comprising:

first and second stripping heads movably mounted on said supporting means for movement to and from said wire stripping position, said first stripping head including said first wire stripping element and said second stripping head including said second wire stripping element, said first and second wire stripping elements, when said first and second stripping heads are in said wire stripping position, presenting said first and second opposed wire contacting surfaces for contacting the plural wires therebetween.

30. A method for simultaneously stripping the insulation from the ends of a plurality of insulated wires comprising the steps of:

separating the wires so that they lie laterally adjacent one another;

restraining the ends of the wires between two opposed, elongated wire contact surfaces that contact opposite sides of the wires and cutting, concurrent with said restraining step, at least partially through the insulation on at least one side of the wires;

moving at least one of said wire contact surfaces laterally of the other to cause said restrained wires to each rotate about their respective axis and at least partially cutting, concurrent with said moving step, the periphery of the insulation on the wires;

separating, in a direction axially of the wires and after the insulation is at least partially peripherally cut, the wires and the wire contact surfaces to remove the peripherally cut insulation from the end of the wires.

31. The method claimed in claim 30 wherein:

the insulated wires are stranded-core, insulated wires and the separation step, after the insulation is at least partially peripherally cut, occurs concurrently with said moving step to simultaneously remove the peripherally cut insulation from the end of the wires and twist the conductor strands.

32. The method claimed in claim 30 in which the moving step further comprises:

moving said wire contact surfaces in opposite lateral directions.

33. The method claimed in claim 30 in which the cutting step includes cutting at least partially through the insulation on opposite sides of the wires.

34. The method claimed in claim 31 in which the moving step further comprises:

moving said wire contact surfaces in opposite lateral directions.

35. The method claimed in claim 31 in which the cutting step includes cutting at least partially through the insulation on opposite sides of the wires.

* * * * *